United States Patent

Clelland et al.

Patent Number: 5,832,372
Date of Patent: Nov. 3, 1998

[54] ANTENNA ASSEMBLY FOR A RADIO TRANSCEIVER

[75] Inventors: David Clelland; Stephen Passmore, both of Surrey, England

[73] Assignee: Nokia Mobile Phones Limited, Salo, Finland

[21] Appl. No.: 713,002

[22] Filed: Sep. 13, 1996

[51] Int. Cl.$^6$ ................................................ H03C 1/62
[52] U.S. Cl. .................... 455/115; 455/129; 455/67.4; 455/226.1; 343/702
[58] Field of Search ........................ 455/115, 129, 455/226.1, 67.1, 67.2, 67.3, 67.4, 575, 226.4, 423, 425; 343/702; 324/73.1, 157, 156, 95

[56] References Cited

U.S. PATENT DOCUMENTS

| | | | |
|---|---|---|---|
| 4,286,335 | 8/1981 | Eichler et al. | 455/89 |
| 4,795,989 | 1/1989 | Hart et al. | 333/116 |
| 4,887,313 | 12/1989 | Luke et al. | 455/612 |
| 4,998,078 | 3/1991 | Hulkko | 333/109 |
| 5,006,812 | 4/1991 | Erickson | 330/2 |
| 5,248,947 | 9/1993 | Shiga | 455/129 |
| 5,276,920 | 1/1994 | Kuisma | 455/101 |
| 5,278,570 | 1/1994 | Jaramillo et al. | 343/702 |
| 5,337,316 | 8/1994 | Weiss et al. | 371/20.5 |
| 5,341,149 | 8/1994 | Valimaa et al. | 343/895 |
| 5,373,231 | 12/1994 | Boll et al. | 324/158.1 |
| 5,483,678 | 1/1996 | Abe | 455/80 |

FOREIGN PATENT DOCUMENTS

| | | |
|---|---|---|
| 0 259 129 | 3/1988 | European Pat. Off. . |
| 0 348 187 | 12/1989 | European Pat. Off. . |
| 2 276 294 | 9/1994 | United Kingdom . |
| 2 281 013 | 2/1995 | United Kingdom . |
| WO 91/15904 | 10/1991 | WIPO . |

*Primary Examiner*—Nguyen Vo
*Assistant Examiner*—Edan Orgad
*Attorney, Agent, or Firm*—Perman & Green, LLP

[57] ABSTRACT

An antenna assembly suitable for testing operation of a radio transceiver. the antenna assembly includes an antenna, a feedline to the radio transceiver and an antenna clip bridging the gap between the antenna and the feedline. The clip is biased open to allow a test probe to provide rf signals to the transceiver when the antennas and transceiver are electrically isolated. When the clip is closed the antenna and the transceiver are electrically coupled.

9 Claims, 3 Drawing Sheets

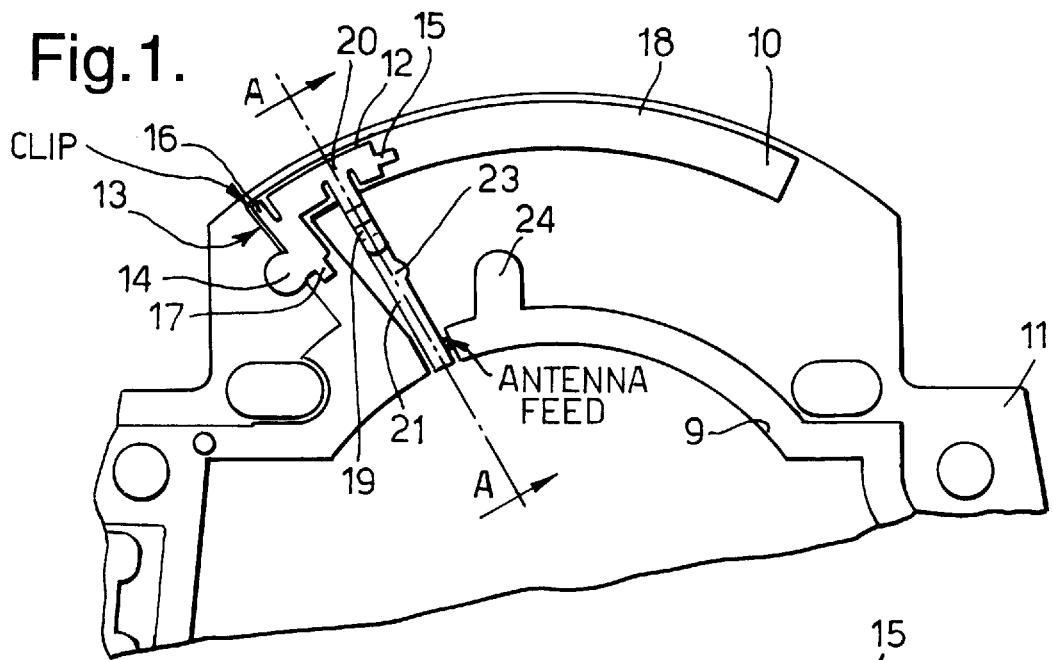
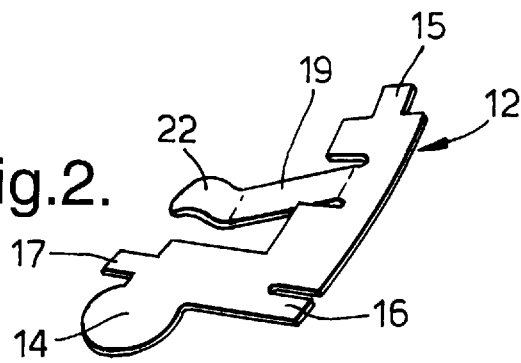
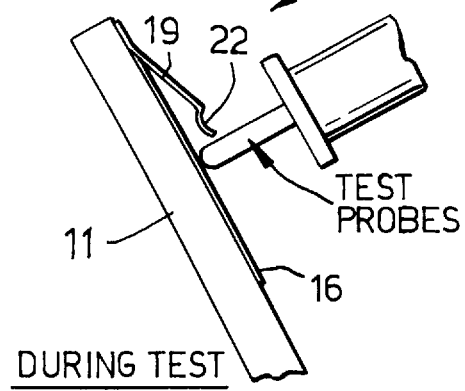
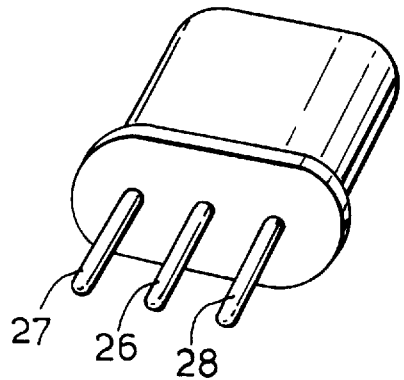

SECTION ON A—A.

SECTION ON B—B.

5,832,372

ANTENNA ASSEMBLY FOR A RADIO TRANSCEIVER

BACKGROUND OF THE INVENTION

The invention relates to antenna assemblies and more particularly to antenna assemblies for radio transceivers.

Antennas internal to the housing of a radio transceiver pose problems for testing the radio frequency (rf) portions of a transceiver. If operation of a radio transceiver is tested before the antenna is connected to the feed point the readings will be more accurate as an rf signal can be introduced directly and with a controlled impedance to the relevant part of the transceiver circuitry. This does, however, mean that there is an additional stage in the manufacturing process as the antenna has to be connected to the circuitry after testing. At this stage further automated soldering is likely to be detrimental to the existing circuitry and another type of automated production stage is unlikely to be any more efficient than hand connection of the antenna. Attachment of the antenna after testing will, therefore, typically be manual with consequent inefficiencies.

If, to avoid manual attachment of the antenna after testing the antenna remains in position while testing of the transceiver takes place, either testing must be accomplished using radiated signals or, if an additional rf signal is fed to the transceiver, spurious rf signals to and/or from the antenna can degrade the test results. Another problem faced if the antenna is kept in position while testing takes place is a mismatch in impedance.

The problems outlined above are realised more acutely when the antenna for the radio transceiver is an internal antenna that could easily be surface mounted automatically during the manufacture of the transceiver prior to testing.

The compromises made in deciding upon how to test antennas are of particular concern in highly automated manufacturing processes such as those of the radio telephone industry.

SUMMARY OF THE INVENTION

In accordance with a first aspect of the present invention there is provided an antenna assembly for a radio apparatus suitable for allowing predetermined radio frequency signals to be introduced for testing operation of a radio transceiver, the assembly comprising an antenna, means for conducting signals between a radio frequency signal input and the radio transceiver and a displaceable coupling member arranged such that in a first position the antenna and the input are electrically isolated and in a second position the antenna and the input are electrically coupled, the coupling member being displaceable relative to the antenna between the first and second positions.

By providing a coupling member that moves relative to the antenna between first and second positions, the antenna can be surface mounted during manufacture of the radio apparatus, as can the coupling member. This arrangement gives all the advantages available when testing takes place with the antenna disconnected while also allowing manufacture to make full use of automation processes.

In accordance with a second aspect of the invention there is provided a method of assembling radio apparatus suitable for allowing predetermined radio frequency signals to be introduced for testing operation of a radio transceiver, the method comprising providing, an antenna, elements for forming a radio transceiver, means for conducting signals between a radio frequency signal input and the radio transceiver, and a displaceable coupling member arranged such that in a first position the antenna and the input are electrically isolated and in a second position the antenna and the input are electrically coupled, on the surface of a substrate; and testing the function of the radio transceiver by applying appropriate signals to the means for conducting with the coupling member in the first position.

The displaceable coupling member is preferably biased towards the first position so that testing can take place without the need to hold the coupling member in the first position. The coupling member is also preferably resilient so that it returns to the first position in the absence of external forces. This allows testing to be repeated if necessary without replacing the coupling member.

The displaceable coupling member is preferably maintained in the second position by abutment with a portion of the radio transceiver housing. This means that when testing is complete and a radio transceiver is placed in a housing to complete the product, the antenna is maintained in contact with the transceiver circuitry without additional assembly stages being necessary.

The coupling member may be a resilient clip which bridges the gap between the antenna and the input. The clip will preferably be fixedly attached to the antenna with a portion displaceable to make and break contact with the radio frequency input.

BRIEF DESCRIPTION OF THE DRAWINGS

The invention will be described in more detail with reference to the accompanying drawings of which:

FIG. 1 is a plan view of a circuit board showing an antenna assembly of an embodiment of the invention;

FIG. 2 is a perspective view of an antenna clip of the embodiment of FIG. 1;

FIG. 3 is a side view of the circuit board of FIG. 1 before assembly in an housing showing a radio frequency test probe in position;

FIG. 4 is a perspective view of a suitable probe;

DESCRIPTION OF THE PREFERRED EMBODIMENTS

Figure 5:
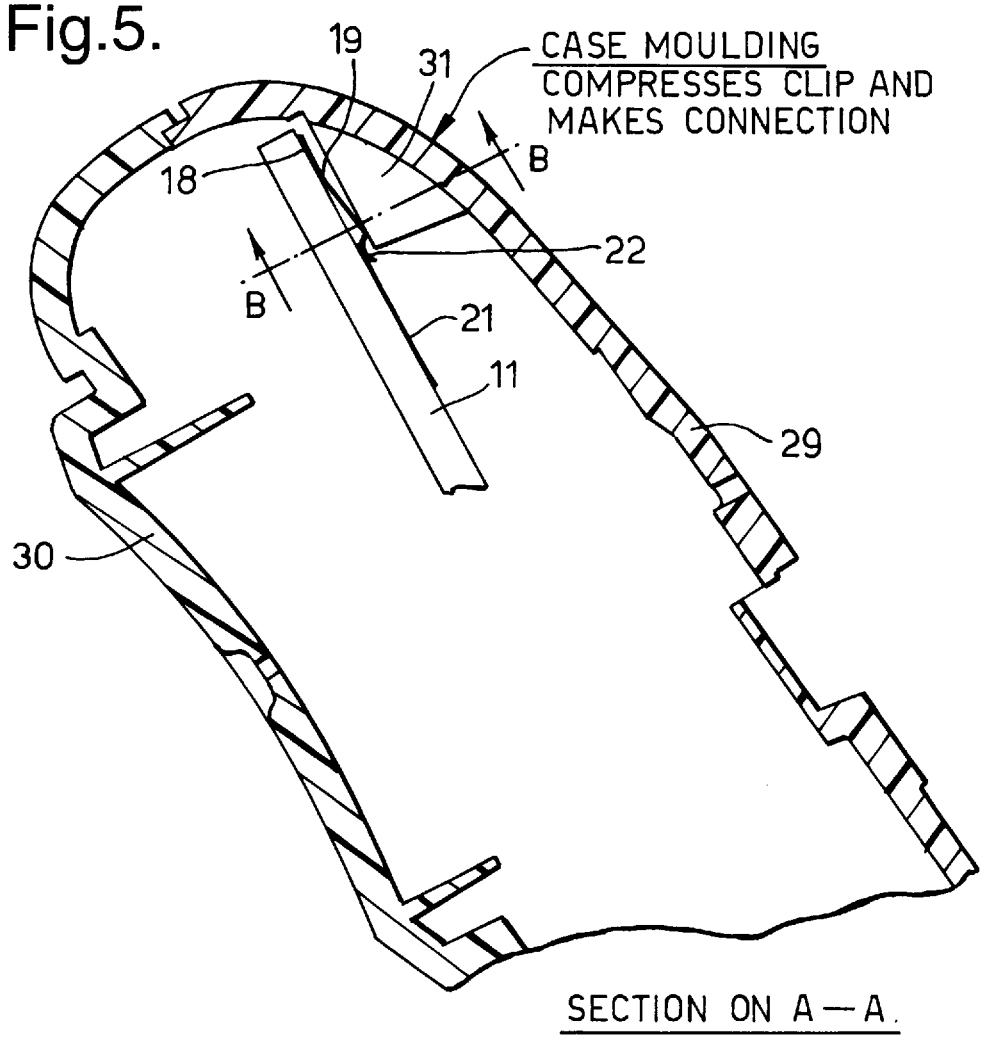
FIG. 5 is a side view of the circuit board of FIG. 3 in an assembled radio telephone housing.

FIG. 1 shows in plan view an antenna assembly in accordance with the present invention. The antenna illustrated is a curved inverted-F antenna 10. The antenna ground 9 is similarly curved. A detailed description of the antenna can be found in copending UK application No. 9515958.8. Other antennas could, however, suitably be used for the antenna assembly of the present invention including other microstrip or stripline antennas. The particular benefits of the invention are realised more fully if the antenna is of a type that allows surface mounting during the normal automated procedure for assembling the radio transceiver.

The antenna of this embodiment is printed on a printed circuit board 11 as part of the automated process for manufacturing the radio transceiver. The antenna is designed to operate at a centre frequency of 1890 MHz in a frequency band of 1880 to 1900 MHz, and requires a bandwidth of at least one per cent of the centre frequency (1890 MHz). The printed circuit board 11 is made of any suitable material using conventional copper metalisation.

A clip 12 seen in perspective in FIG. 2 is positioned over the stub end 13 of the antenna 10 in good electrical contact therewith. The clip is provided with a ground pad 14 and three solder pads 15, 16, 17 for connection to the antenna 10. The clip 12 is arranged to lie over the inductive stub 13 of the microstrip antenna and partially along the capacitative end 18 of the antenna. The three solder pads 15, 16, 17 provide adequate electrical connection between the clip 12 and the antenna 10. The ground pad 14 is coupled to the ground of the inductive stub 13. The clip 12 can be surface mounted automatically with other components removing the need for additional manual assembly stages.

The clip 12 has a leg 19 provided to bridge the gap between a feed point 20 on the antenna and a conductive line 21 for coupling with the radio transceiver. The leg 19 is raised and in the absence of external forces is positioned directly above, but apart from, the conductive line 21. The clip is made from a resilient material to allow repeated contact with the conductive line while each time returning to the separated position for testing to be repeated if desired. A suitable material for the clip has been found to be phosphor bronze with a gold flash over nickel plate coating. Contact between the leg 19 and the conductive line 21 takes place at a curved foot portion 22. The resilience of the clip material enables the foot 22 to make good contact with the conductive line provided sufficient force is applied to the leg 19.

As can be seen clearly from FIG. 1, there are three testing contacts two of which a central rf pad 23 and a ground pad 24 are provided on the printed circuit board 11, the third being the ground pad 14 provided on the clip. These allow the performance of the radio transceiver which the antenna is serving to be tested using a radio frequency probe 25 (illustrated in FIG. 4). With the clip in the open position as shown in FIG. 3 there is no connection between the antenna and the transceiver circuitry of the radio transceiver. A probe can therefore be positioned to provide rf signals to, or receive them from the central pad 23.

One piece of test apparatus suitable for use with the antenna assembly of this embodiment has a central probe 26 for feeding and/or receiving radio frequency signals to and/or from the transceiver. It also has two outer grounded probes 27, 28 that connect to a coaxial cable of which the central probe is the central conductor. The two outer probes 27, 28 are positioned for contact with the ground pads 14, 23 on the circuit board to ground the outer conductor of the coaxial cable. As can be seen in FIG. 1 the outer pads are connected to ground. The rf pad 23 and the two ground pads 14, 24 provide a controlled impedance which allow accurate and repeatable tests to be made.

With the antenna clip open, rf signals can be sent to the transceiver for alignment of radio frequency elements of the transceiver such as crystals and any other elements that need to be factory tuned because of the design spreads of the phone. The rf signals provided via the feed 21 can also be used to calibrate the Received Signal Strength Indication (RSSI). In addition the transmit frequency, transmit current and power of the telephone can be assessed by connecting the probe to a spectrum analyser or other suitable detector and monitoring signals transmitted by the radio transceiver of the radio telephone.

Figure 5A:
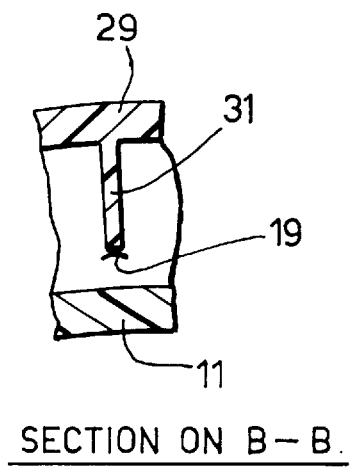
FIG. 5a is a section through the insert shown in FIG. 5.

Once testing of the radio transceiver is completed the antenna is electrically coupled to the feed line supplying the transceiver. The housing of the radio telephone in the present embodiment is designed to depress the raised leg of the clip when the two halves of the housing 29, 30 illustrated in FIG. 5 are jointed together. In the present invention the housing of the radio telephone has been provided with an insert 31 that is positioned to coincide with the location of the raised leg 19 of the clip. The cross-section of the insert 31 can be seen in FIG. 5a. The precise dimensions of the insert 31 are not critical so long as it is of a suitable size and shape to provide the required down pressure on the clip for a good connection between the foot and the conduction line to be achieved. Any other mechanism by which the clip foot is held in firm contact with the conduction line could, however, be substituted. In the present example, by providing the means to hold the clip in the contact position as part of the moulding of the radio transceiver housing, no additional assembly stages are needed to complete manufacture of the radio transceiver. The housing can be clipped, screwed, or otherwise held together to maintain contact between the clip foot and the conduction line. As the final part of the manufacturing process takes place to present the radio transceiver for sale, the antenna is simultaneously connected to the conduction line at its feed point.

The clip conduction can be tested when the radio telephone has been fully assembled. One advantage of the present invention is, however, that the raised leg can be depressed to contact the feed line prior to assembly of the housing if desired. This allows the coupling provided by the clip when closed to be assessed before assembly is complete and any antenna tests that might be required to be carried out prior to assembly. This may be desirable to avoid repeated assembly and disassembly of the radio telephone housing.

Further tests can be performed once the antenna has been connected using radiated radio frequency signals received and transmitted by the antenna.

Figure 6:
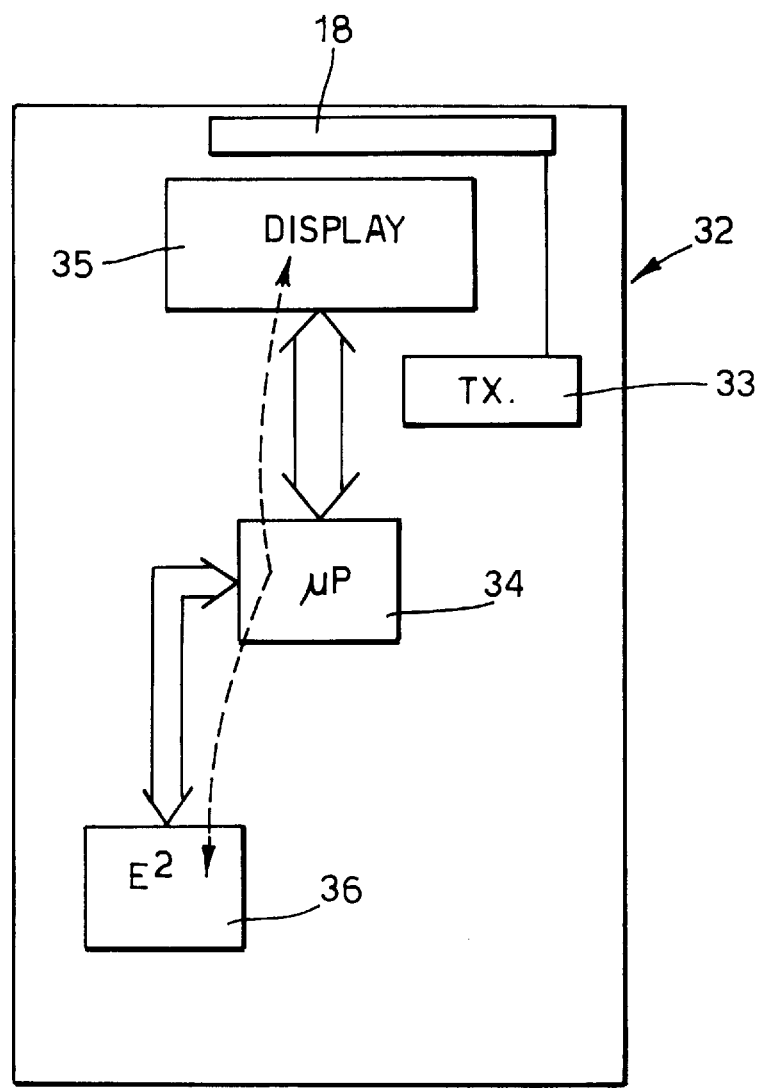
FIG. 6 is a schematic view of a radio telephone suitable for an antenna assembly of the embodiment of the invention of FIG. 1.

FIG. 6 is a schematic representation of a radio telephone 32 suitable for receiving an antenna assembly of the type illustrated in FIG. 1. The antenna provides signals to a radio transceiver 33. A microprocessor 34 controls a display 35 and the information that is stored in an EEPROM memory 36.

The present invention includes any novel feature or combination of features disclosed herein either explicitly or any generalisation thereof irrespective of whether or not it relates to the claimed invention or mitigates any or all of the problems addressed.

In view of the foregoing description it will be evident to a person skilled in the art that various modifications may be made within the scope of the invention in particular the type of antenna and materials used can change without departing from the scope of the invention.

We claim:

1. An antenna assembly for a radio apparatus suitable for allowing predetermined radio frequency signals to be introduced for testing operation of a radio transceiver, the assembly comprising an antenna, means for conducting signals between a radio frequency signal input and the radio transceiver and a displaceable coupling member arranged such that in a first position the antenna and the input are electrically isolated and in a second position the antenna and the input are electrically coupled, the coupling member being displaceable relative to the antenna between the first and second positions, wherein the displaceable coupling member is maintained in the second position by abutment with a housing for the radio transceiver.

2. An antenna assembly according to claim 1, wherein the displaceable coupling member is biased towards the first position.

3. An antenna assembly according to claim 1, wherein the coupling member is a resilient clip.

4. An antenna assembly according to claim 1, wherein the antenna is a microstrip antenna.

5. An antenna assembly for a radio apparatus suitable for allowing predetermined radio frequency signals to be introduced for testing operation of a radio transceiver, the assembly comprising an antenna, means for conducting signals between a radio frequency signal input and the radio transceiver and a displaceable coupling member arranged such that in a first position the antenna and the input are electrically isolated and in a second position the antenna and the input are electrically coupled, the coupling member being displaceable relative to the antenna between the first and second positions, wherein the coupling member is a resilient clip in permanent electrical contact with the antenna.

6. An antenna assembly according to claim 5, wherein the displaceable coupling member is biased towards the first position.

7. An antenna assembly according to claim 5, wherein the antenna is a microstrip antenna.

8. A method of assembling radio apparatus suitable for allowing predetermined radio frequency signals to be introduced through a test apparatus with controlled impedance in direct contact with a radio transceiver for testing operation of the radio transceiver, the method comprising steps of:

providing an antenna, elements for forming a radio transceiver, means for conducting signals between a radio frequency signal input and the radio transceiver, and a displaceable coupling member arranged on a surface of a substrate such that in a first position the antenna and the input are electrically isolated and in a second position the antenna and the input are electrically coupled;

testing the function of the radio transceiver by applying appropriate signals to the means for conducting with the coupling member in the first position; and assembling the radio transceiver into a housing that is structurally adapted to permanently maintain the coupling member in the second Position while the radio transceiver is assembled within the housing.

9. An antenna assembly for a radio apparatus suitable for allowing predetermined radio frequency signals to be introduced for testing operation of a radio transceiver, the assembly comprising an antenna, means for conducting signals between a radio frequency signal input and the radio transceiver, and a displaceable, coupling member arranged such that in a first position the antenna and the radio frequency signal input are electrically isolated and in a second position the antenna and the radio frequency signal input are electrically coupled, the coupling member being displaceable relative to the antenna between the first and second positions, wherein the displaceable coupling member is urged into and maintained in the second position by abutment with a protective cover for the radio transceiver.

\* \* \* \* \*

UNITED STATES PATENT AND TRADEMARK OFFICE
CERTIFICATE OF CORRECTION

PATENT NO.  : 5,832,372
DATED       : Nov. 3, 1998
INVENTOR(S) : Clelland et al.

It is certified that error appears in the above-identified patent and that said Letters Patent is hereby corrected as shown below:

```
    On the cover page, after item [22], insert
 --[30]  Foreign Application Priority Data
    Sep. 25, 1995 [GB]       United Kingdom ......9520210.7--
```

Signed and Sealed this

Thirtieth Day of March, 1999

Attest:

Attesting Officer

Q. TODD DICKINSON

Acting Commissioner of Patents and Trademarks